(12) United States Patent
Baumann et al.

(10) Patent No.: US 7,284,771 B2
(45) Date of Patent: Oct. 23, 2007

(54) EXHAUST GAS BELLOWS EXPANSION JOINT

(75) Inventors: Hermann Baumann, Tettnang (DE); Josef Hausknecht, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 95 days.

(21) Appl. No.: 11/115,734

(22) Filed: Apr. 27, 2005

(65) Prior Publication Data

US 2005/0242577 A1 Nov. 3, 2005

(30) Foreign Application Priority Data

May 3, 2004 (DE) ............. 10 2004 021 799

(51) Int. Cl.
*F16L 27/10* (2006.01)
(52) U.S. Cl. .............. 285/226; 285/227; 285/123.3
(58) Field of Classification Search ........... 285/226, 285/227, 123.3
See application file for complete search history.

(56) References Cited

U.S. PATENT DOCUMENTS

| | | | | |
|---|---|---|---|---|
| 2,014,355 A | | 9/1935 | Hussman | |
| 3,029,094 A | * | 4/1962 | Parlasca et al. | 285/114 |
| 3,051,515 A | * | 8/1962 | Graves | 285/228 |
| 3,127,200 A | * | 3/1964 | Sayag | 285/226 |
| 3,299,417 A | * | 1/1967 | Sibthorpe | 340/605 |
| 3,725,565 A | * | 4/1973 | Schmidt | 174/13 |
| 3,747,367 A | * | 7/1973 | Muller | 464/79 |
| 3,901,539 A | | 8/1975 | Ijzerman | |
| 3,934,618 A | | 1/1976 | Henderson | |
| 4,215,882 A | | 8/1980 | Bosch | |
| 4,576,404 A | | 3/1986 | Weber | |
| 5,011,194 A | * | 4/1991 | Nitta | 285/41 |
| 5,016,439 A | | 5/1991 | Nitta | |
| 5,331,810 A | | 7/1994 | Ingermann et al. | |
| 5,427,419 A | * | 6/1995 | Frey et al. | 285/123.1 |
| 6,296,282 B1 | * | 10/2001 | Burkhardt et al. | 285/226 |
| 6,315,332 B1 | * | 11/2001 | Aschoff et al. | 285/227 |
| 6,902,203 B2 | * | 6/2005 | Kang | 285/226 |

FOREIGN PATENT DOCUMENTS

| | | |
|---|---|---|
| DE | 35 39 778 C1 | 5/1987 |
| DE | 20003386 | 6/2000 |
| EP | 1291501 | 12/2003 |
| GB | 1 351 136 | 4/1974 |

* cited by examiner

*Primary Examiner*—David Bochna
(74) *Attorney, Agent, or Firm*—Klaus P. Stoffel; Wolff & Samson PC

(57) ABSTRACT

An exhaust gas bellows expansion joint for joining a first section and a second section of an exhaust pipe. The exhaust gas bellows expansion joint including a first corrugated pipe for conveying exhaust gas through the joint, a protective sleeve, which is inserted in the first corrugated pipe, a second corrugated pipe, which coaxially surrounds the first corrugated pipe, and an annular space between the first corrugated pipe and the second corrugated pipe for the passage of liquid through the joint.

6 Claims, 2 Drawing Sheets

EXHAUST GAS BELLOWS EXPANSION JOINT

BACKGROUND OF THE INVENTION

The invention concerns an exhaust gas bellows expansion joint for joining a first section and a second section of an exhaust pipe.

Those skilled in the art are familiar with the plain pipe joint for joining two sections of an exhaust pipe. In this type of pipe joint, a first section with a greater inside diameter is pushed over a second section. Due to the self-locking nature of the joint, additional fastening of the pipes to each other is not necessary. However, to ensure that self-locking occurs, it is necessary to provide suitably great overlapping of the sections. This results in a large overall length.

DE 35 39 778 C1 describes an exhaust pipe which is surrounded by a water-cooled jacket. An air gap is provided between the exhaust pipe and the jacket for thermal insulation. The junction of a first section with a second section of the exhaust pipe is designed as a plain pipe joint. The water passage from a first jacket to a second jacket is produced by a joint sleeve. However, to obtain effective joining of the sections of the exhaust pipe and the surrounding jacket, it is absolutely necessary to achieve exact positioning of the parts to be joined.

U.S. Pat. No. 2,014,355 describes an exhaust gas bellows expansion joint for connecting a first section and a second section of an exhaust pipe. This joint consists of an inner pipe for conveying the exhaust gas, a second pipe that concentrically surrounds the first pipe, and a flange at each end face for connecting the exhaust gas bellows expansion joint with a section of the exhaust pipe. The second pipe is radially spaced from the first pipe to form an annular space. The inner pipe consists of a first corrugated pipe, which is connected with the first flange, a second corrugated pipe, which is connected with the second flange, and a pipe length, which is located in a middle section between the first and second corrugated pipes. The surrounding second pipe is also designed as a corrugated pipe in this middle section. Cooling fluid is supplied to the annular space between the first and second pipes through a radial admission port in the area of the first flange. This cools the inner pipe. The cooling fluid is discharged through a radial discharge port in the area of the second flange. The exhaust gas bellows expansion joint described here has only limited applicability for an internal combustion engine with exhaust gas turbochargers, since energy is extracted from the exhaust gas by the cooling. This reduces the efficiency of an exhaust gas turbocharger.

SUMMARY OF THE INVENTION

The object of the present invention is to provide an exhaust gas bellows expansion joint for joining a first section and a second section of an exhaust pipe of an internal combustion engine with an exhaust gas turbocharger, which compensates thermal expansion and positional misalignment of the exhaust pipe.

The exhaust gas bellows expansion joint of the present invention comprises a first corrugated pipe for conveying exhaust gas, a protective sleeve, which is inserted within the first corrugated pipe, a second corrugated pipe, which coaxially surrounds the first corrugated pipe, and an annular space between the first and second corrugated pipes for the passage of liquid through the joint. To fasten the exhaust gas bellows expansion joint to the exhaust pipe, flanges are provided at the end faces. The flanges have axial openings for feeding liquid to the annular space. The protective sleeve inserted in the first corrugated pipe is double-walled and is inserted in the first corrugated pipe in such a way that an air gap is formed between the protective sleeve and the first corrugated pipe.

The invention makes it possible for lateral misalignments of the exhaust pipe to be compensated by the exhaust gas bellows expansion joint. The first corrugated pipe for conveying the exhaust gas is protected against excessive temperatures by the protective sleeve. The protective sleeve and the air gap effectively prevent heat loss from the exhaust gas. The simple design of the exhaust gas bellows expansion joint allows inexpensive manufacture.

In accordance with one embodiment of the invention, it is proposed that the first corrugated pipe and the second corrugated pipe have a first, uniformly corrugated region and a second, nonuniformly corrugated region. The first, uniformly corrugated region is located, for example, immediately adjacent to the flanges, and the second region is located in the middle section of the exhaust gas bellows expansion joint. This embodiment achieves the advantage that the exhaust gas bellows expansion joint has a lower weight, so that the possibility of stimulation of vibrations is reduced.

Other features and advantages of the present invention will become apparent from the following description of the invention that refers to the accompanying drawings.

DETAILED DESCRIPTION OF THE INVENTION

Figure 1:
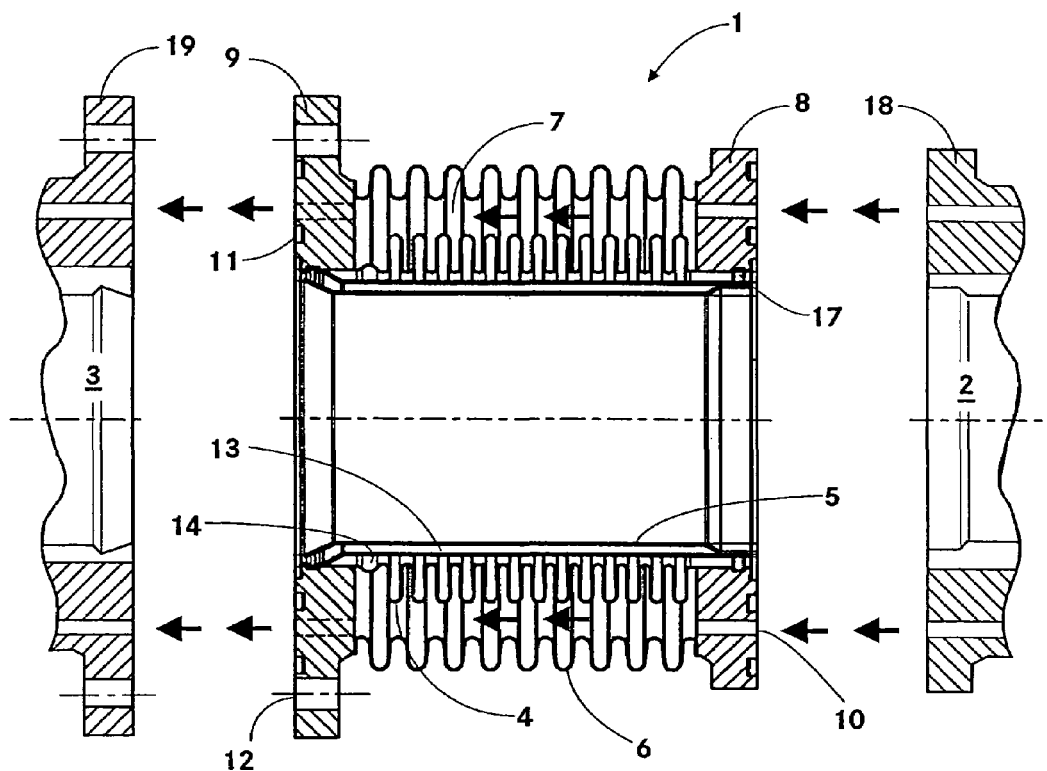
FIG. 1 shows a sectional view of the exhaust gas bellows expansion joint.

FIG. 1 shows a sectional view of the exhaust gas bellows expansion joint. The exhaust gas bellows expansion joint 1 connects a first section 2 and a second section 3 of an exhaust pipe. The exhaust gases of the internal combustion engine are supplied to an exhaust gas turbocharger (not shown) through the exhaust pipe. The exhaust gas bellows expansion joint 1 is screwed (drill holes 12) to the respective sections of the exhaust pipe by means of a first flange 8 and a second flange 9. To seal the surfaces of the flanges from the exhaust pipe, grooves 11 for holding gaskets are provided. The gaskets arranged in the grooves are located in an area that has low temperatures. Other components of the exhaust gas bellows expansion joint 1 include a first corrugated pipe 4, a second corrugated pipe 6, and a protective sleeve 5. The second corrugated pipe 6 surrounds the first corrugated pipe 4 at a certain radial distance to form an annular space 7. The two corrugated pipes are welded with the flanges 8, 9. The protective sleeve 5 is welded with the second flange 9. The protective sleeve 5 is supported on the inside diameter of the first flange 8 by a ring 17. The protective sleeve 5 is formed with a double wall that forms a first air gap 13. The protective sleeve 5 is inserted in the first corrugated pipe 4 in such a way that a second air gap 14 is formed between the protective sleeve 5 and the first corrugated pipe 4. The first section 2 of the exhaust pipe is surrounded by a first jacket 18. The second section 3 of the exhaust pipe is surrounded by a second jacket 19.

The exhaust gas bellows expansion joint 1 works as follows:

The exhaust gas from the first section 2 of the exhaust pipe is conveyed to the second section 3 of the exhaust pipe through the first corrugated pipe 4 with the inserted protective sleeve 5. Liquid passes from the first jacket 18 to the second jacket 19 through openings 10 in the first flange 8, the annular space 7, and openings 10 in the second flange 9. In FIG. 1, this passage of the liquid through the joint is indicated by arrows. The transfer of heat from the exhaust gas to the liquid in the annular space 7 is reduced by the first air gap 13 and the second air gap 14.

Figure 2:
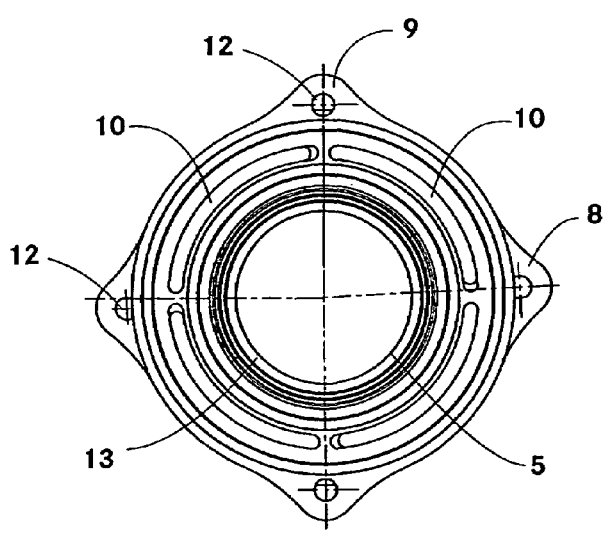
FIG. 2 shows the exhaust gas bellows expansion joint viewed towards the end face.

In FIG. 2, the exhaust gas bellows expansion joint is shown in a view towards the end face of the second flange 9. This view shows the openings 10 for the outflow of liquid to the second jacket 19. The drawing also reveals the 90° staggering of the drill holes 12 in the two flanges 8 and 9.

Figure 3:
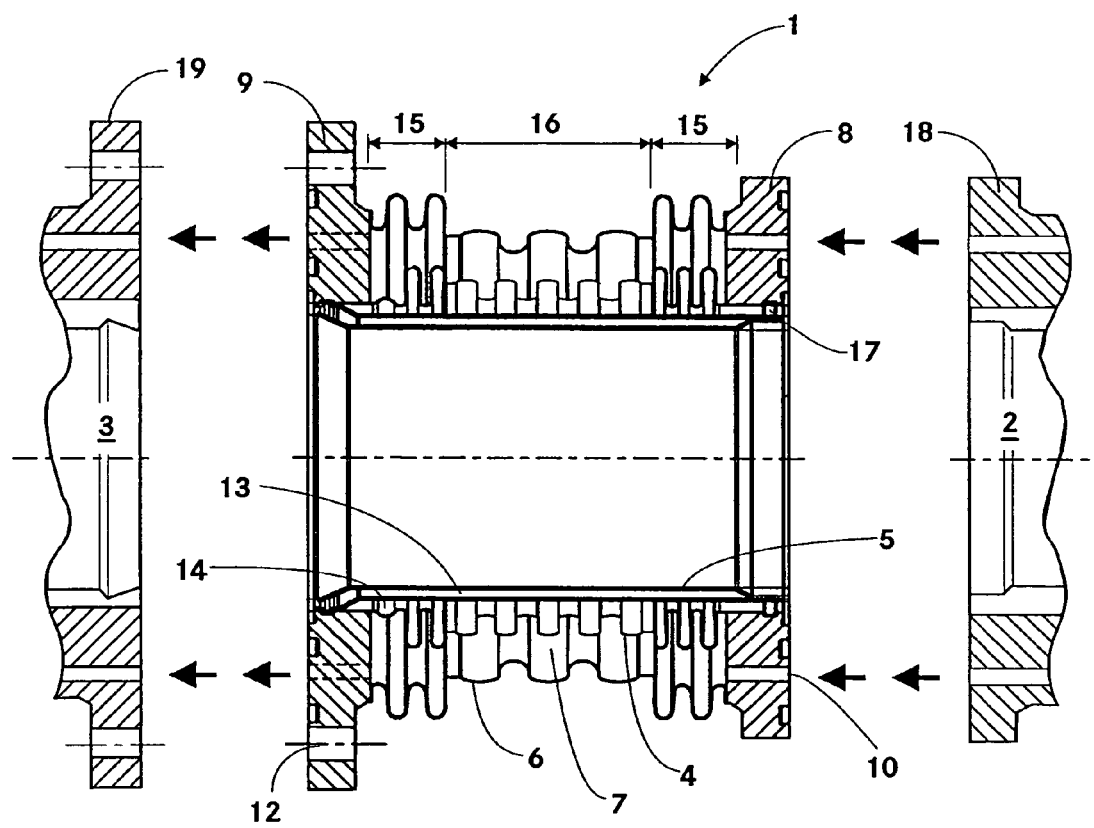
FIG. 3 shows the exhaust gas bellows expansion joint with differently corrugated regions.

FIG. 3 shows a second embodiment of the exhaust gas bellows expansion joint 1. The exhaust gas bellows expansion joint 1 of FIG. 3 differs from the exhaust gas bellows expansion joint 1 of FIG. 1 in that both the first corrugated pipe 4 and the second corrugated pipe 6 have a second region 16 with smaller or discontinuous corrugation. In other words, both the first corrugated pipe 4 and the second corrugated pipe 6 have a first, uniformly corrugated region 15 and a second, nonuniformly corrugated region 16. As FIG. 3 shows, the first region 15 of the two corrugated pipes 4, 6 is immediately adjacent to the flanges 8, 9. The second region 16 is located in a middle section between the first regions 15. This embodiment reduces the weight of the exhaust gas bellows expansion joint 1. A reduction of the weight produces a change in the natural frequency of the exhaust gas bellows expansion joint, thereby significantly reducing the possibility of stimulation of vibrations. Otherwise, this exhaust gas bellows expansion joint works as described in connection with FIG. 1.

The description reveals the following advantages of the exhaust gas bellows expansion joint of the invention:
- changes in length due to the temperature and lateral misalignment of the sections of an exhaust pipe are effectively compensated;
- the protective sleeve and the two air gaps protect the first corrugated pipe and have an insulating effect, i.e., loss of heat from the exhaust gas is reduced;
- the gaskets are located in a region that has low temperatures;
- the simple design allows inexpensive manufacture; and
- assembly and disassembly of the exhaust gas bellows expansion joint is possible without disassembly of the adjacent components.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An exhaust gas bellows expansion joint for joining a first section and a second section of an exhaust pipe, comprising: a first corrugated pipe for conveying exhaust gas through the joint; a second corrugated pipe which coaxially surrounds the first corrugated pipe so as to form an annular space between the first corrugated pipe and the second corrugated pipe for passage of liquid through the joint; a double-walled protective sleeve arranged in the first corrugated pipe so that an air gap is formed between the protective sleeve and the first corrugated pipe; and a flange located at each end face of the exhaust gas bellows expansion joint for connecting the exhaust gas bellows expansion joint with the sections of the exhaust pipe.

2. The exhaust gas bellows expansion joint in accordance with claim 1, wherein the first corrugated pipe and the second corrugated pipe are fixed with the flanges.

3. The exhaust gas bellows expansion joint in accordance with claim 2, wherein the flanges have axial openings for conveying liquid into or out of the annular space.

4. The exhaust gas bellows expansion joint in accordance with claim 1, wherein the protective sleeve is fixed to one of the flanges.

5. The exhaust gas bellows expansion joint in accordance with claim 1, wherein the first corrugated pipe and the second corrugated pipe have a first, uniformly corrugated region and a second corrugated region with corrugations smaller than the first region.

6. The exhaust gas bellows expansion joint in accordance with claim 5, wherein the first corrugated region is located immediately adjacent to the flange.

* * * * *